United States Patent [19]

Cronin

[11] 4,143,410
[45] Mar. 6, 1979

[54] ELECTRIC POWER SYSTEM CONTROL UTILIZING LOW LEVEL SIGNALS AND MINIATURE GAGE WIRING

[75] Inventor: Michael J. Cronin, Sherman Oaks, Calif.

[73] Assignee: Lockheed Aircraft Corporation, Burbank, Calif.

[21] Appl. No.: 755,557

[22] Filed: Dec. 30, 1976

[51] Int. Cl.² .............................................. H02H 3/08
[52] U.S. Cl. ..................................... 361/93; 340/660; 361/88; 361/92
[58] Field of Search ...................... 361/92, 191, 88, 90, 361/93, 98, 101, 91; 340/248 B, 248 A, 660, 661, 663; 307/350

[56] References Cited

U.S. PATENT DOCUMENTS

| | | | |
|---|---|---|---|
| 3,673,588 | 6/1972 | Riff | 340/248 A |
| 3,814,986 | 6/1974 | Zanini | 361/92 X |
| 3,944,889 | 3/1976 | Conway | 340/248 B |

*Primary Examiner*—Patrick R. Salce
*Attorney, Agent, or Firm*—Ralph M. Flygare

[57] ABSTRACT

Control circuit system wherein low level signals are delivered through small (miniature) gauge control conductors to remote control circuit breakers to control connection of load devices to load bus through use of solid state circuitry. Such control may be used between the flight station of an aircraft and the various load centers remote therefrom, in an automobile or in an industrial or utility system. The circuitry is also responsive to faults in the load circuits, and current limiting warning lights (CLWL's) located in the power supply of the control conductors may limit current and indicate the status of faults in the control and/or remote power circuits. A large number of CLWL's for the different circuits may be arranged in a matrix at a control station and means with corresponding load identifying indicia are provided to facilitate changes and correlation of lighted CLWL's with respect to the controlled load switching device. The load switching devices may be associated in a plurality of priority groups and means provided to disconnect all the devices in a group simultaneously either manually or sequentially in reverse order of group priority upon increasing power system failures or in response to other control logic.

7 Claims, 9 Drawing Figures

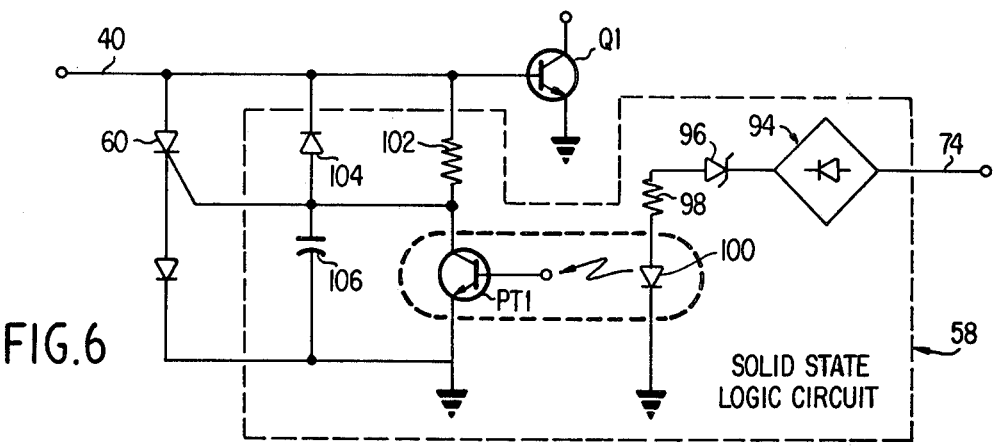
FIG.6
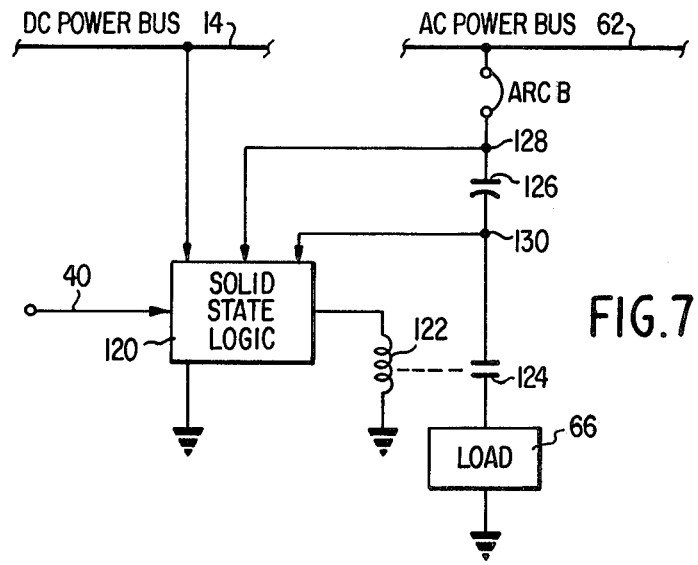
FIG.7
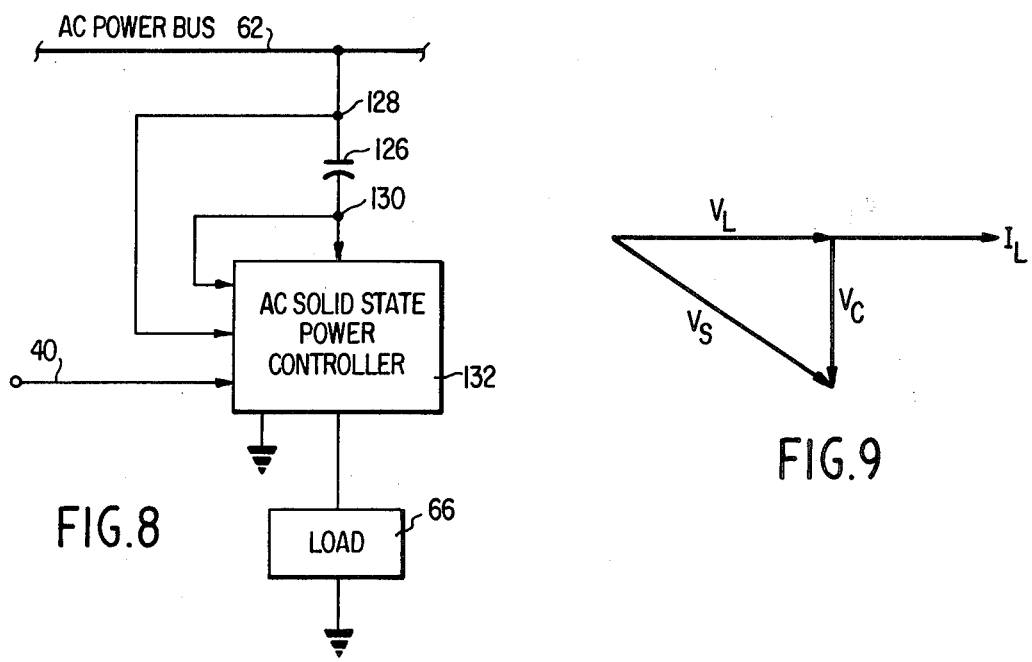
FIG.8
FIG.9

ELECTRIC POWER SYSTEM CONTROL UTILIZING LOW LEVEL SIGNALS AND MINIATURE GAGE WIRING

BACKGROUND OF THE INVENTION

In electrical systems for controlling airplanes, it is necessary to provide the flight control station with means for selectively operating load switching devices located in various remote portions of the plane. The load switching device may actuate power lights, landing gear controls, flight control surfaces, and the like. Frequently, the loads require relatively large amounts of power. Ordinarily, a radial or local power wires of relatively heavy gauge supply the power buses which are located at strategic points throughout the aircraft.

It is necessary to locate control switches for the various loads at the flight station and the load switching devices near the locations of power utilization. The load switches must be capable of withstanding overload currents due to faults and short circuits momentarily before they are able to break the load circuits in response to overload sensing elements. Formerly, load circuit switches have been controlled through the use of operating coils energized directly from the control switches. The control wire thus had to be extended all the way from the control switch to the locations of the loads and was subject to exposure of high fault currents. This not only called for control switches capable of handling heavy currents, but it also required a relatively large gauge wire be extended all the way from the control switches at the flight station to the load circuit switch at each load location. An airplane usually has load switching devices, generally numbering in the order of many hundreds. Also, the load switching devices are frequently a substantial distance from the flight station. As a result, excessive wire weight and insulation was required to reduce the danger of smoke and fire hazards. In addition, circuit breakers which are especially crude electro-thermal or electro-magnetic devices were needed to protect the wiring.

It is accordingly an object of the present invention to provide a novel method and control system which avoids a need for extending relatively large gauge wire between each of the control switches energized from the voltage supply bus at a central control station and each of the remote locations of the load switching devices.

It is a further object of the present invention to provide a novel current limiting means, such as current limiting warning lights (CLWL's), at the control station to permit low power signals to be passed through the CLWL's and the control switches to supply control signals to solid state circuitry in the controllers or load switching devices located at strategic areas of power utilization.

It is also an object of the present invention to provide a novel system employing solid state circuitry in remote control circuit breakers (RCCB's) or controllers both to provide ultimate control of the circuit making and breaking the power circuits in response to control switch commands and in response to fault conditions in the control or power wiring. The CLWL's in response to such fault conditions will light to indicate fault conditions and will simultaneously limit the fault current in the control circuits and in the power circuits where solid state controllers are utilized.

A further object of the present invention is to provide a system for controlling the operation of load switching devices in either d.c. or a.c. load circuits. In the case of a.c. loads, it is an additional object of the present invention to use reactance elements, such as a.c. capacitors, in the load circuit to act as current limiting devices.

Still another object of the present invention is to provide a novel system utilizing CLWL's in the control circuit to provide fault indications in the miniature wire gauge control lines, and to provide by means of a clamp or ground on the control line an indication of faults in the power circuits.

It is still yet another object of the present invention to provide a novel system in which a single line of miniature gauge wire, e.g. 30 gauge or less, can be utilized for trip reset, status, and on-off control while minimizing smoke and fire hazards.

These and many other objects and advantages will be apparent from the claims and from the following detailed description when read in conjunction with the appended drawings.

DESCRIPTION OF THE DRAWINGS

FIG. 6 is a schematic wiring diagram of another logic system in accordance with the present invention;

FIG. 7 is a partial schematic wiring diagram in accordance with the present invention using capacitor means for power limiting in an alternating current load circuit;

FIG. 8 is a wiring diagram of an embodiment of the present invention similar to FIG. 7 showing a system a solid state power controller used therein; and FIG. 9 is a vector diagram illustrating the current and voltage relationships in the load circuits of the embodiments of the invention illustrated in FIGS. 7 and 8.

DETAILED DESCRIPTION

Figure 1:
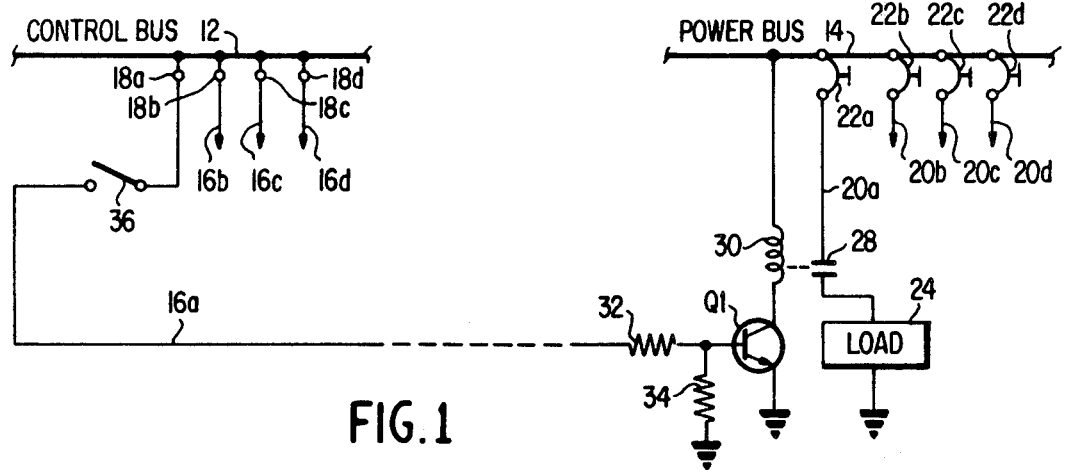
FIG. 1 is a schematic wiring diagram of a control system in accordance with the present invention.

The system of the present invention will hereinafter be described in the environment of an aircraft and, with reference to FIG. 1, an electric conductor or control bus 12 located in the flight station such as the pilot's cabin of an aircraft may be energized with a voltage of 28 volts d.c. A load distribution or power bus extends to various spaced load positions throughout the aircraft where different load devices are disposed, typically the wing roots, and may be energized with the same 28 volts d.c. or a substantially higher voltage as dictated by the loads serviced. The control bus 12 at the flight station may be connected to a plurality of conductors 16a, 16b, 16c and 16d through resistors 18a, 18b, 18c and 18d, respectively, of the bead or integrated circuit type. A plurality of load circuit wires 20a, 20b, 20c and 20d are connected to the power bus 14 through conventional circuit breakers 22a, 22b, 22c and 22d, respectively, of the manual reset type. These load circuit wires ordinarily are displaced a substantial distance apart to supply load circuits at different locations in the aircraft to operate various controlled loads such as the flight control surface activators, landing gear, etc.

For simplification, the complete control circuit for only a single one of the loads is shown. Thus, a load 24 is connected between the system ground and the power bus 14 through the circuit breaker 22a and the normally open contacts 28 of the operating coil 30 of a relay. The operating coil 30 is in a circuit between the power bus 14 and a suitable conventional electronic switch such as the illustrated NPN transistor Q1. The base electrode of the transistor Q1 is connected to a resistor divider network comprising resistors 32 and 34 supplied with power through the manually operated switch 36 in the control line 16a.

The use of a transistor driver instead of a usual power relay makes it unnecessary to run large gauge power conductors to the relay from the control means at the flight station. With regard to the control of the exemplary load 24 in the present case, the resistor 18a is of a value substantially limiting the current from bus 12. Thus, a miniature control line 16a and a miniature control switch 36 may be used to control the driver transistor Q1.

In operation, the closure of control switch 36 in the control circuit acts to impress a forward bias on the base of the transistor Q1 to render it conductive and thereby energize the coil 30 to close the relay contacts 28 and apply power from the power bus 14 to the load 24. Similarly, opening the switch 36 removes the forward bias on the base of the transistor Q1 driving it into cut-off, de-energizing the coil 30, opening the contacts 28, and thus disconnecting load 24 from the power bus 14.

Figure 2:
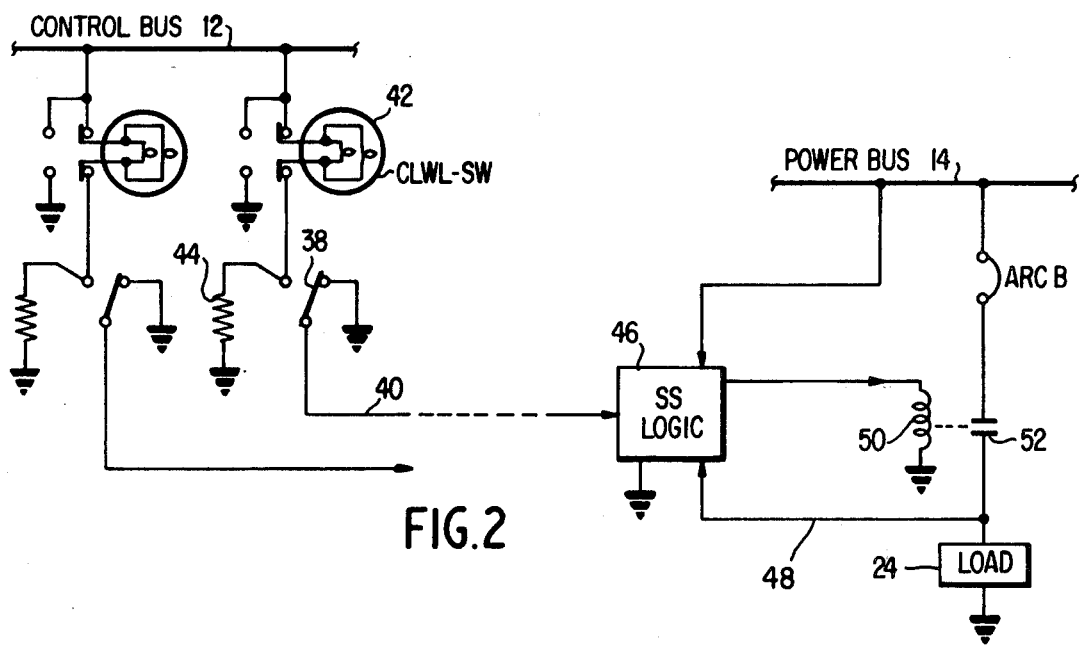
FIG. 2 is a schematic wiring diagram of another embodiment of a control system in accordance with the present invention.

A more preferred system including, inter alia, load fault isolation and indication features, is illustrated in FIG. 2 where like elements have been accorded numerical designations like those of FIG. 1. With reference to FIG. 2, a flight station control bus 12 is connected to one terminal of a control circuit switch 38 in miniature gauge conductor 40 through a current limiting warning lamp switch (CLWL-SW) 42. This lamp switch 42 preferably includes an incandescent lamp and has its two terminals normally biased by spring means (not shown) into position applying power to the conductor 40. To impress full control bus voltage on the lamp switch for continuity testing, the lamp switch may be pushed inwardly against the spring bias so that its terminals disengage the line contacts and engage contacts connected between control bus 18 and ground potential. A bleed resistor 44 may be connected from the CLWL-SW to ground and is of sufficient resistance to prevent the CLWL-SW 42 from becoming luminescent under normal conditions when both filaments of the lamp are in working order. Failure of one of the filaments will sufficiently increase the current through the other filament to effect a slight but noticeable degree of incandescence as disclosed in detail in the co-pending application Ser. No. 755,558 entitled "Dual Filament Current Limiting and Status Indicating Circuit" filed concurrently herewith and hereby incorporated herein by reference.

The switch 38 may be provided with a grounded contact for engagement with the moveable arm to ground the input to the power controller and thus prevent stray signals from reaching the power controller when the switch 38 is open.

With continued reference to FIG. 2, a miniature gauge conductor 40 extends from the moveable contact of the switch 38 to an input terminal of a controller which includes a suitable conventional solid state logic circuit 46 at the location of a power bus 14 and connected thereto. As a practical embodiment, a number of the solid state logic circuits may be carried by a single printed circuit board and may be supplied by a single conductor incorporating overcurrent protection such as the circuit breaker shown. Power bus redundancy may be used to insure the integrity and reliability of the application of power to the logic circuits.

The solid state logic circuit 46 includes the sense logic which monitors the status of the power circuit via the conductor 48. The main requirement for this solid state logic circuit is that it be controllable by a low level signal to supply current to the operating coil 50 of a conventional power relay having normally open contacts 52 in the power circuit between the load 24 and the power bus 14.

Upon the occurrence of a fault in the power circuit, which fault may be a dead short or any other fault condition between that and a normal circuit, the resulting loss of voltage will be sensed through feedback conductor 48 to effect the grounding of the conductor 40 after a short time delay.

Grounding of the conductor 40 with the switch 38 in the closed position will cause the CLWL-SW 42 to become incandescent at full brilliance. The nature of the CLWL-SW 42 is such that the lamp filaments limit the current in the conductors 40 and resistor 44 to, for example, 40 milliamps. The CLWL-SW 42 being in the circuit, its resistance determines the maximum circuit fault current.

A further advantage is that the current limiting by the CLWL-SW 42 permits use of small gauge wire such as typical in round wire-flat cables for the conductor 40. Also, it provides current limiting in the conductor 40 in the event of both a dead short or low impedance leakage in the conductor itself.

Another problem solved by the invention is the prevention of cycling which would ordinarily occur in the load circuit because of the use of an automatic reset circuit breaker (ARCB).

It is thus clear that a fault in either the load circuit or in the control conductor 40 will cause grounding of the line 40. Any such fault will cause CLWL-SW 42 to become incandescent to indicate the fault to the pilot. Also, a fault will cause the controller (50, 52) to return to a fail-safe condition as already mentioned, opening the load circuit and protecting the load 24. The CLWL-SW 42 provides the further advantage of an active and inherently continuous response to the status of the conductor 40. That is, the lamp (42) will glow with a brilliance varying in intensity with the degree of the short on that conductor and extending up to what can be full brilliance in the case of a complete or dead short. In the case of the load circuit, however, the CLWL-SW 42 can be only fully on or fully off because of the operation of the controller. A significant advantage of this control circuitry is that it permits the remote resetting of the power circuit supplied from the bus 14. When conventional manual reset circuit breakers (MRCB's) are used, it is necessary to physically reset each circuit breaker at the power bus 14 location. The circuit of the present invention thus provides on/off control, trip, reset, and status indication over a single miniature gauge wire. The weight and space savings achievable by the use of this system are self evident and competitive with the far more expensive and complicated multiplex type of system.

While the CLWL-SW's in the circuit described above provide satisfactory performance, they do require a separate manual operation to test each light for filament continuity. This requirement may be avoided and other advantages obtained by using the status signalling arrangement disclosed in the co-pending U.S. patent application Ser. No. 755,558, entitled "Dual Filament Current Limiting and Status Indicating Circuit", cited hereinabove and incorporated by reference in this application. The co-pending application discloses an arrangement with two lamp filaments connected in parallel so that, in the absence of a fault in the associated control or load circuits, the current shared by the two filaments is insufficient to produce visible brightness. However, as open circuit on one of the filaments effects a slight glow as all of the current flows through the remaining filament. This dim incandescence automatically indicates the need for replacement of the CLWL-SW. In the case of line or load faults, a CLWL-SW will become brightly lighted with one or two operative filaments as a result of the significantly increased fault induced current flow through the CLWL-SW.

Only one entire load system portion, comprising a control circuit, controller and load circuit, is shown in FIG. 2. However, such circuitry may be repeated for each load in the airplane, and the number of such circuits may total many hundred. By way of illustration, a second controller circuit including a second CLWL-SW and a manually operated control switch connected to the control bus 12 at the flight station are shown in FIG. 2.

Figure 3:
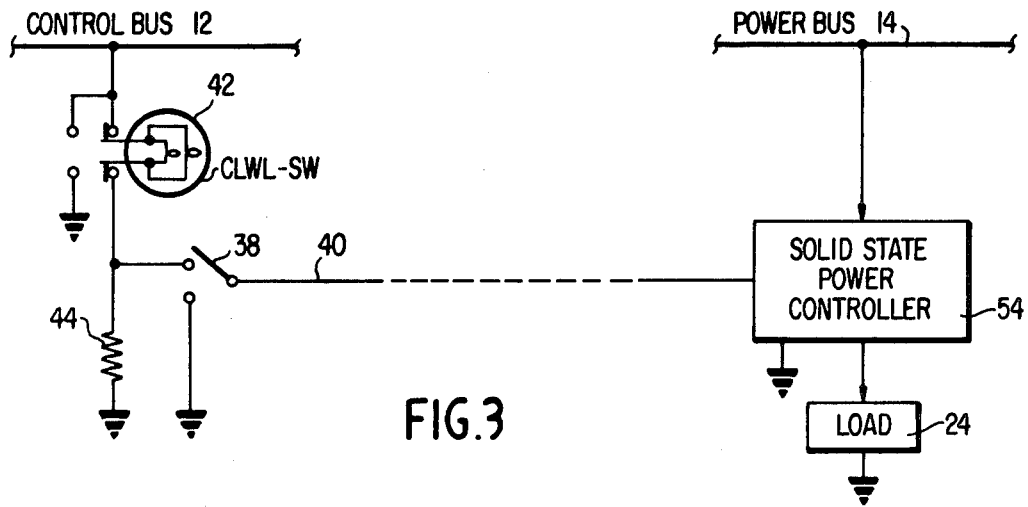
FIG. 3 is a schematic wiring diagram of an embodiment of a control system in accordance with the present invention utilizing a solid state power controller.

In a further embodiment of the present invention, the solid state logic circuit 46 and power relay (50, 52) illustrated in FIG. 2 may be replaced by a solid state power controller which includes electronic means for effecting the control of power from the power bus 14 to the load 24. As shown in FIG. 3, where the elements like those in FIG. 2 have been accorded a like numerical designation, the solid state power controller 54 may also include the overcurrent sensing provided in the circuit of FIG. 2 by the ARCB. The solid state power controller circuit 54 may be, for example, the type disclosed in the co-pending application Ser. No. 755,560 entitled "Solid State Power Controller with Low Level Signal Control" filed concurrently herewith and hereby incorporated herein by reference.

The present invention may be utilized in the control of three-phase a.c. loads. As shown in FIG. 3 where the elements in FIG. 2 have again been accorded a like numerical designation, the use of a two filament CLWL-SW of the aforementioned co-pending application and the basic relationship of a portion of a multiple priority load management arrangement to the load control circuits is illustrated.

Figure 4:
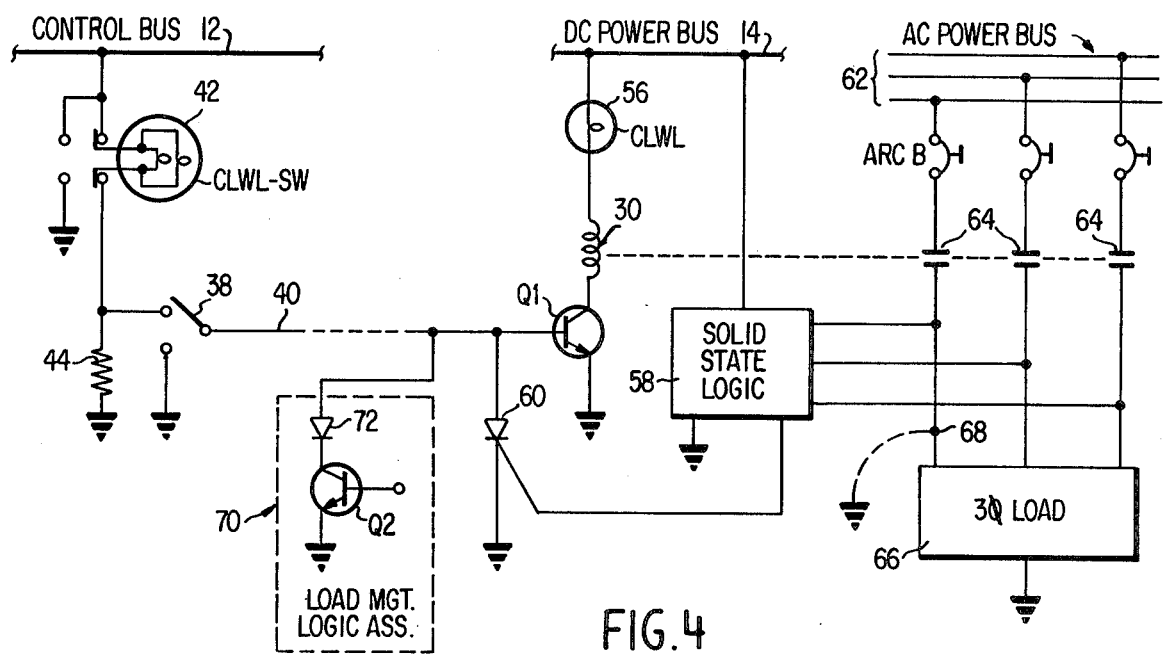
FIG. 4 is a schematic wiring diagram of an embodiment of a control system in accordance with the present invention in association with a load management logic system.

With reference to FIG. 4, the flight station may be provided with a 28 volt d.c. control bus 12 for providing power to a plurality of control circuits such as the illustrated circuit including a control switch 38, a CLWL-SW 42 and a bleed resistor 44 which is self-monitoring as to filament continuity as previously described.

At the load station, a 28 volt d.c. power bus 14 is connected through a current limiting warning light (CLWL) 56, the operative winding 30 of a relay and the emitter-to-collector circuit of an electronic switch such as the illustrated NPN transistor Q1. The CLWL 56 will provide current limiting and warning light functions in that circuit and may be of the dual filament self-monitoring type. A solid state logic circuit 58 is also connected to the 28 volt d.c. power bus 14 to supply a control signal to the gating electrode of silicon-controlled rectifier (SCR) 60 connected with its anode to cathode circuit between the base electrode of the transistor Q1 and ground potential. Finally, each of the three respective phase conductors of the a.c. load circuit provide a power sensing feedback to the logic circuit 58.

Also at the load station is a three-phase a.c. load bus 62 to which a three-phase load 66 is connected through a set of normally open contacts 64 of a load relay and an automatic reset circuit breaker (ARCB) desirably of the thermal bimetal or magnetic type which open upon overheating as a result of excess current caused by a fault and reclose upon cooling. Finally, each of the three respective phase conductors of the a.c. load circuit provide a power sensing feedback to the logic circuit 58.

The circuit of the transistor Q1, the coil 30 and contacts 64 of the power relay and the logic circuit 58 together constitute a load circuit controller serving functions corresponding to those of the controller for the d.c. load circuit of FIG. 2.

In operation, the circuit of FIG. 4 as so far described will, upon closure of control switch 38, impose a positive potential through the miniature guage conductor 40 onto the base electrode of the transistor Q1. This forward biases the transistor Q1 into conduction to energize the winding 30 of the relay and close the set of relay contacts 64 to energize the three-phase load 66 from three-phase a.c. power bus 62. Upon occurrence of a fault in any phase of the load circuit, e.g. a ground as illustrated at point 68, the ARCB in that line will open. This loss of power will be sensed by the solid state logic circuit 58 and a positive triggering potential applied to the gate electrode of the SCR 60 to render it conducting. Conduction of the SCR 60 latches the control conductor 40 to ground potential lighting the CLWL-SW 42 to indicate the existence of a fault. The conduction of the SCR 60 also removes the forward bias from the base electrode of the transistor Q1 driving it into cutoff and deenergizing the relay coil 30 to open the contacts 64 in all three phases of the a.c. load circuit completely isolating the load 66. This protects a load such as a three-phase motor against burn-out on two phase operation.

After such response to a fault, as above described, the logic circuitry keeps the control line 40 latched to ground potential and the relay contacts latched in the open condition even after the ARCB in the faulty phase of the load circuit has reset. Resetting of the relay can be effected by pressing the CLWL-SW 42 or by grounding the control switch 38 since either will remove the holding current or positive-to-negative-anode-to-cathode bias of the SCR 60 permitting it to cut off.

In addition to the functions as above described, FIG. 4 further shows a connection of the control line 40 to a load management logic assembly circuit 70. The assembly 70 is shown schematically as connecting the control line 40 through a diode 72 and in the collector-to-emitter path of an NPN transistor Q2. The circuit will not be described in this application as it is disclosed and claimed in the co-pending application Ser. No. 755,656 entitled "Electric Power Control System With Load Management Programming" filed concurrently herewith and hereby incorporated herein by reference. In operation, however, the load management logic assembly functions, when not manually disconnected, in either a "Manual" or "Automatic" mode to effect the conduction of the transistor Q2 upon command or in response to a fault condition. Conduction of the transistor Q2 will ground the control line 40 to remove the conduction bias from the transistor Q1 deenergizing the a.c. load as explained above by removing power from the relay coil 30. The CLWL-SW 42 will become incandescent under such condition to indicate the disconnecting of the a.c. load 66.

Figure 5:
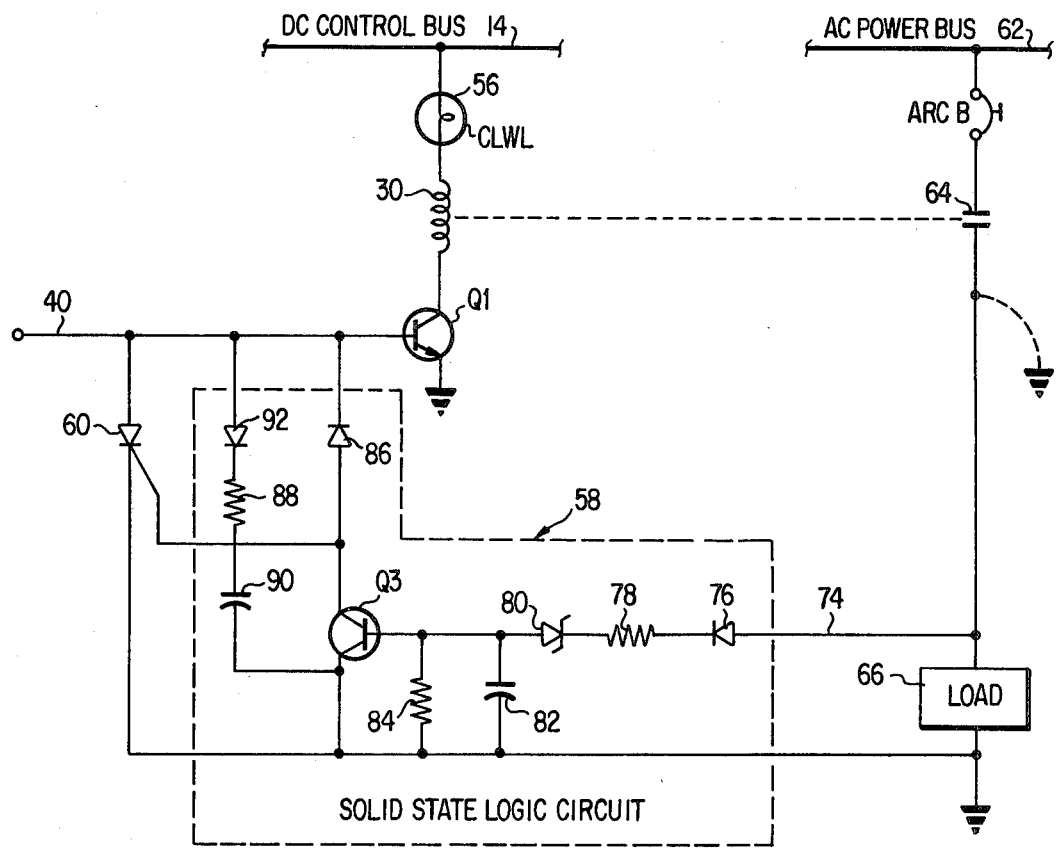
FIG. 5 is a partial schematic wiring diagram of an embodiment of the present invention showing a logic system in detail.

The solid state logic circuit 58 of the circuit of FIG. 4 may be of the type illustrated in FIG. 5 where, for simplicity, only the circuitry associated with a single-phase load is shown. Since the circuitry at the control station for activating control circuit conductor 40 may be the same as that illustrated in FIG. 4, that circuitry is not repeated.

With reference to FIG. 5, where elements like those of FIG. 4 have been accorded a like numerical designation, the control line 40 is connected to the base electrode of the transistor Q1, the collector-to-emitter circuit of which is connected in series with the relay coil 30 and the CLWL 56 to a 28 volt power bus 14. A single phase load 66 is shown connected in series with the normally open contacts 64 of the relay and an automatic reset circuit breaker (ARCB) to an a.c. power bus 62. A feedback line 74 connects the load circuit to the solid state logic circuit 58.

The feedback line 74 is connected through a rectifier 76, a resister 78 and Zener diode 80 to the interconnection of a capacitor 82, a resistor 84 and the base electrode of an electronic switch such as the illustrated NPN transistor Q3 with its emitter grounded. The transistor Q3 has its collector electrode connected through a diode 86 to the control line 40, to the interconnection of a resistor 88 and a capacitor 90 of a voltage divider network comprising a diode 92, the resistor 88 and the capacitor 90 connected between the control line 40 and ground potential, and to the gate electrode of the SCR 60.

Under normal voltage conditions with the load 66 energized, the rectified voltage applied to the base electrode of the transistor Q3 would render the transistor Q3 conductive to clamp the gate electrode of the SCR 60 to ground potential. The conduction of the transistor Q3 also serves to shunt the current from the control line 40 through the diode 92 and the resistor 88 away from the capacitor 90 to prevent the charging thereof. However, if the relay failed to close upon command or if a fault occurred in the load circuit, the forward bias on the base electrode of the transistor Q3 would be lost to render the transistor non-conductive. After a short time delay determined by the values of the resistor 88 and the capacitor 90, a positive charge would accumulate on the capacitor 90 sufficient to trigger the SCR 60 and clamp the control line 40 to ground potential deenergizing the transistor Q1 and then the relay coil 30.

A modified form for the logic circuit 58 of FIG. 5 is shown in FIG. 6, where elements like those of FIG. 5 have been given a like numeric designation. In this modified circuit, the conductor 74 from the load circuit supplies input current through a full wave rectifier 94 to a Zener diode 96, a resistor 98 and a light emitting diode 100. The diode 100 is disposed in light receiving proximity to a light responsive solid state device such as the illustrated grounded emitter photo-transistor PT1. The collector electrode of the photo-transistor PT1 is connected to the control line 40 through a resistor 102, to the gate electrode of an SCR 60, and to the interconnection of a diode 104 and a capacitor 106 which form a voltage divider network between the control line 40 and ground potential.

In normal operation, the application of a control signal from the flight station over the control line 40 tends to charge the capacitor 106 via the resistor 102. In the absence of a fault, the potential sensed via the conductor 74 will cause the light emitting diode 100 to irradiate the photo-transistor PT1 to maintain it in conduction as a shunt of the current to the capacitor 106. In the event of a fault and the loss of the potential on the line 74, the diode 100 will cease to emit light and the photo-transistor PT1 will cease conduction to remove the shunt of the capacitor 106. Capacitor 106 will then charge and, after a time delay determined by the values of the resistor 102 and the capacitor 106, effect triggering of the SCR 60 to clamp the control conductor 40 to near ground potential. The loss of the control signal on the control line 40 will drive the transistor Q1 into cutoff as explained above to open the power circuit.

FIG. 7 represents a modified control circuit for an a.c. load which includes a reactive impedance such as a capacitor in the load circuit for current limiting purposes. Since the flight station circuitry may be the same, for example, as that shown in FIG. 2 for controlling d.c. loads or that shown in FIG. 4 for a.c. loads, only the control circuit conductor from the flight station and the power circuit is shown in FIG. 7. For illustrative purposes, only a single phase load and simple representation of a solid state logic circuit are shown.

With reference to FIG. 7 where elements like those of FIGS. 3 and 4 have been accorded like numerical designations, the control line 40 is connected to a solid state drive circuit 120. The drive circuit 120 may include circuitry similar to that previously described. It is connected to a 28 volt d.c. power bus 14 and is operative to energize the operating coil 122 of a relay to close the normally open contacts 124 in the a.c. power circuit to the load 66 from the a.c. power bus 62 energized from a three phase 200/115 volt power source as used in aircraft. A capacitor 126 is also connected in series in the a.c. power circuit and terminals 128 and 130 on opposite sides of capacitor 126 are connected to the drive circuit 120 to provide it with a voltage representative of the current in the power circuit. The drive circuit may also, as described earlier, be provided with a ground latch as shown.

In operation, the logic circuit 120 of FIG. 7 responds to a voltage across the capacitor 126 which is a voltage analog of the load current. This voltage, when in excess of a preselected value, latches the control line 40 to ground potential and de-energizes relay coil 122 to the relay contacts 124 in the a.c. power circuit. The clamping of the control line 40 effects the illumination of the associated CLWL-SW at the control station in the usual manner.

The conventional relay circuit control system of FIG. 7 may be replaced by a solid state power controller as shown in FIG. 8 to achieve the advantages of current limiting. With reference to FIG. 8 where like elements in FIG. 7 have been accorded like numerical designations, an a.c. solid state power controller 132 may be connected in series with the capacitor 126 and the load 66 and receive the contact signal from the flight station over the control line 40 as well as the voltage analog of load current from the terminals 128 and 130.

A particular advantage of the FIG. 7 and FIG. 8 arrangements is that they utilize the capacitor 126 in series with the load 66 to limit current in a manner made clear in conjunction with the vector diagram of FIG. 9. With reference to FIG. 9, the vector $I_L$ represents the load current, and $V_L$ represents the load voltage. The vector $V_S$ represents the supply voltage at the a.c. power bus 62 and the vector $V_c$ represents the voltage of the capacitor 126 in the a.c. load circuit.

By design, the voltage drop across the capacitor 126 may be as high as 25 volts. It is, however, a quadrature voltage and the load voltage $V_L$ will only be reduced to a value of 112.24 volts at rated current. In the event of a short circuit, the fault current can only increase in the ratio of 115 volts/25 volts or about 4.6 to 1. It is thus evident that a resistor cannot be used to drop the 25 volts because the load voltage $V_L$ would be reduced by that amount from 115 volts to 90 volts and the power dissipated would be 250 watts if the rated current were 10 amps. The advantage of the current limiting capacitor is that it dissipates minimal heat because the power equals the product of the voltage, current, and power factor, the power factor of the capacitor being very low.

With continued reference to FIG. 9, a fault causes the load current and hence the voltage $V_c$ across the capacitor 126 to increase. Logic or internal adjustment of the controller can be made to cause operation at a selected value of $V_c$ proportional to the amplitude of a predetermined fault load current. Since the capacitor can limit the maximum current under any conditions, the usual circuit breaker may be eliminated as shown. Moreover, the fact that the capacitor 126 acts as a current limiter in the manner described permits the controller to respond to excessive voltage drop across the capacitor. Thermally sensitive devices, such as the solid state a.c. power controller of FIG. 8, will thus be readily protected by this current limiting technology.

The present invention has been described in conjunction with specific disclosures of preferred embodiments thereof. However, various modifications and variations of these described forms of the invention will be apparent to persons of ordinary skill in the art in the light of these specifically described forms. It is intended therefore that the foregoing detailed descriptions of the invention as illustrated in the drawings be considered as exemplary only and that the scope of the invention be determined from the following claims.

What is claimed is:

1. An electrical control system for an airplane containing an electric power source comprising:
   a plurality of electrical load devices at spaced locations in the airplane;
   power conductor means extending from said power source to said locations;
   a controller at each said location including switch means operable to connect the load device thereat in an energizing circuit from said power conductor means and solid state means responsive to a control signal of predetermined polarity to operate the switch means;
   a voltage source of said predetermined polarity;
   control means including a plurality of switch means each selectively operable to apply said control signal from said voltage source to a control conductor extending to each of said solid state means;
   means in each of said controllers responsive to a change in current in the associated load energizing circuit due to a fault to neutralize a control signal on the control conductor extending to the solid state means; and
   an incandescent lamp in the circuit between said voltage source and each control switch means to provide an indicating light when a control signal on the control conductor connected through said switch means is neutralized.

2. An electrical control system as recited in claim 1 wherein:
   each said control conductor is of small gauge size with respect to that required to supply operating power to said controllers; and
   each said lamp further acts to limit current in the circuit thereto from said voltage source when the control signal on the control conductor is neutralized.

3. An electrical control system for an airplane containing an electric power source, and having a system ground, comprising:
   a plurality of electrical load devices at spaced locations in the airplane;
   power conductor means extending from said power source to said locations;
   a controller at each said location including switch means operable to connect the load device thereat in an energizing circuit from said power conductor means and solid state means responsive to application of a control signal of predetermined polarity to operate the switch means;
   a voltage source of said predetermined polarity;
   control means including an indicator lamp and a switch connected in sequence between said voltage source and a control circuit conductor extending to each of said solid state means to apply a control signal thereto;
   means in each of said controllers responsive to a change in current in the associated load energizing circuit due to a fault to connect the control circuit conductor engaging the solid state means to the system ground.

4. An electrical control system as recited in claim 3 wherein:
   each said indicator lamp include at least one filament and is effective to provide an indicating light upon a control circuit conductor connected thereto being connected to ground in response to said means responsive to a fault in said energizing circuit or upon occurrence of a ground fault in the said control circuit conductor itself.

5. An electrical control system as recited in claim 4 wherein:
   each said indicator lamp further lights to different degrees of brightness varying in proportion to different degrees of leakage to ground that may occur on the said control circuit conductor connected thereto.

6. An electrical control system as recited in claim 4 wherein:
   a reactive impedance means is connected in each said energizing circuit in series with the said load device therein; and
   the said means in each said controller responsive to a change in current in the energizing circuit includes means responsive to the voltage across said reactive impedance means.

7. An electrical control system as recited in claim 6 wherein:
each said reactive impedance means is a capacitive impedance of a magnitude such as to normally provide a voltage drop thereacross which is of a substantial value relative to the voltage of said power source and to limit substantially the maximum current in said energizing circuit in the case of a fault therein.

* * * * *